Oct. 23, 1951  E. E. PRATHER  2,572,659
CLUTCH CONTROL MECHANISM
Filed Dec. 13, 1949  2 SHEETS—SHEET 1

INVENTOR
EDWIN E. PRATHER
BY H.O. Clayton
ATTORNEY

INVENTOR
EDWIN E. PRATHER
BY
H.V.Clayton
ATTORNEY

Patented Oct. 23, 1951

2,572,659

UNITED STATES PATENT OFFICE 2,572,659

CLUTCH CONTROL MECHANISM

Edwin E. Prather, South Bend, Ind., assignor to Bendix Aviation Corporation, South Bend, Ind., a corporation of Delaware Application December 13, 1949, Serial No. 132,779

9 Claims. (Cl. 192—.075)

This invention relates in general to power means for operating the friction clutch of an automotive vehicle and in particular to improving upon that type of clutch control mechanism of the day wherein a clutch operating pressure differential operated motor is controlled by the accelerator of the vehicle in cooperation with an operation of a vehicle speed responsive governor and the change speed transmission of the vehicle.

One of the principal objects of my invention is to provide a clutch control mechanism operable to effect the desired engagement of the clutch under both normal and abnormal conditions of service. For example, in starting the vehicle in motion with a cold engine it is best to engage the clutch rather lightly thereby preventing a stalling of the engine; and this operation of the clutch is particularly desirable when said clutch is of the friction type and the driving and driven plates thereof are covered with oil.

Yet another object of my invention is to provide a clutch control mechanism for operating the friction clutch of an automotive vehicle said mechanism including a pressure balanced valve operative, in accordance with the temperature of the engine, to control the clutch engaging operation of the mechanism; and a further object of my invention is to provide a clutch control mechanism including a pressure balanced valve operative, in accordance with the operation of a clutch pedal in its control of the clutch and an engine starter switch to control the clutch engaging operation of the mechanism.

It is a further object of my invention to provide, in an automotive vehicle including a so-called wet clutch, a manually operated clutch pedal and an engine starter switch operated by said pedal, power means for operating the clutch said means being, in part, controlled by switch means actuated by the clutch pedal in its operation of controlling the engine starter switch.

Yet another object of my invention is to provide power means for operating the friction clutch of an automotive vehicle including a pressure balanced valve operative to control the power means in its control of the loading of the clutch plates when they first contact with each other, the operation of said valve being controlled in part by an operation of the accelerator of the vehicle and by a manual operation of the clutch pedal incidental to its operation of operating the engine starter switch to crank the engine.

Yet another object of my invention is to provide a clutch control mechanism for operating the friction clutch of an automotive vehicle said mechanism, in the operation of getting the vehicle under way, effecting a relatively severe first engagement of the clutch immediately after the engine is started, all subsequent engagements of the clutch being of a relatively light nature. Such an operation of the clutch has particular utility when the plates of the clutch are covered with oil; for the aforementioned severe engagement of the clutch serves to effect the desired acceleration of the vehicle despite the presence of oil on the clutch plates. The oil is, with the first engagement of the clutch plates, thrown off of the driving plate by centrifugal force making it necessary, to avoid an undesirable grabbing operation of the clutch and resultant jerking of the vehicle, to make all subsequent engagements of the clutch plates relatively light in nature. By a light engagement of the clutch plates is meant one wherein said plates are moved into engagement with each other with a minimum of force.

The above objectives are accomplished by the clutch control mechanism of my invention; and other objects of the invention will appear more fully hereinafter from the following description when taken in connection with the accompanying drawings wherein a single embodiment of the invention is illustrated.

Figure 1:
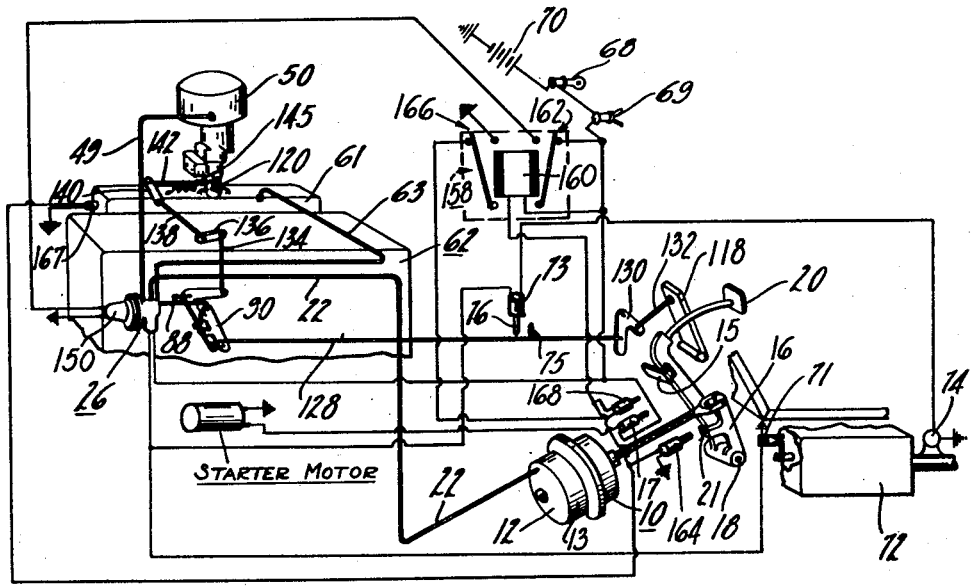
Figure 1 is a diagrammatic view disclosing the principal features of my invention.

Describing now that embodiment of my invention disclosed in the drawings the principal elements thereof consist of a single acting vacuum motor 10 comprising a casing 12 and a power element such as a piston, not shown, which is connected to a friction clutch, not shown, of a conventional design. Such a clutch preferably includes driving and driven friction members, commonly known as plates, one of said members being biased into engagement with the other by spring means; and it is to be noted at this juncture that the mechanism of my invention has particular utility when employed to operate what is known in the art as a wet clutch.

One end of the casing of the motor 10, a portion of the body thereof, and the power element of the motor together outline a control chamber 13, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism of my invention; and as found in certain automotive vehicles of the day, the pedal 20, when sufficiently depressed, serves, through the intermediary of a bar 15, to operate the engine starter switch 17 of the vehicle whereby there is provided a mechanism for starting the engine when the clutch pedal is depressed. The lost motion connection between the pedal 20 and the crank 16 provides a means for effecting a manual operation of the clutch to disengage the same when the clutch operating power means is momentarily inoperative; and this connection also makes possible a power operation of the clutch without moving the clutch pedal.

Figure 3:
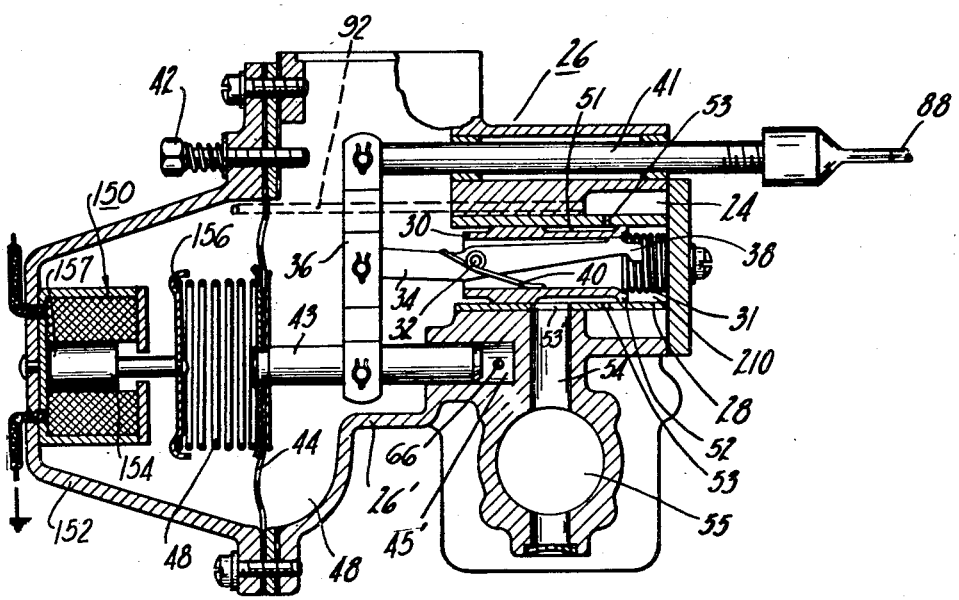
Figure 3 is a longitudinal sectional view disclosing details of the valve mechanism of my invention.
Figure 4:
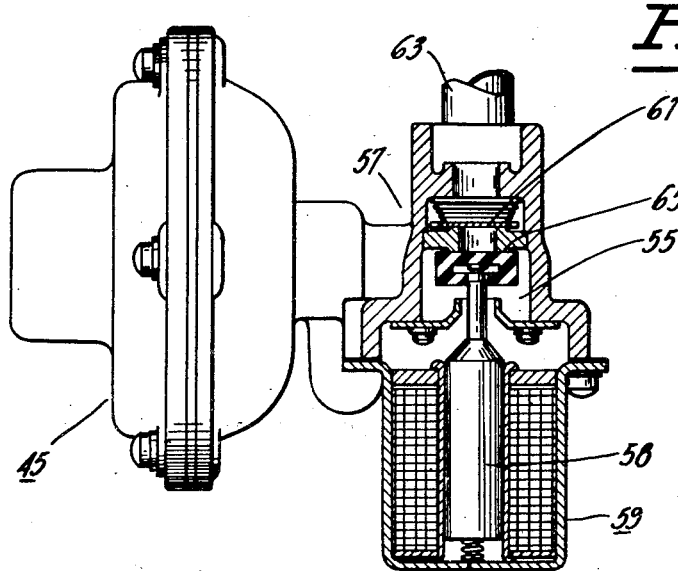
Figure 4 is a view, partly in section, disclosing details of the solenoid and spring operated three-way valve of the valve mechanism of my invention.

One end of the motor 10, that is the end of the same constituting a part of the aforementioned power compartment 13 of the motor, is connected by a conduit 22 to a manifold compartment 24 of a control valve unit indicated as a whole by the reference numeral 26; and two different views of said unit are disclosed in Figures 3 and 4 of the drawings. The casing 26' of the unit 26 is provided with a cylindrically shaped bore to receive a cylindrical sleeve valve member 28 constituting one of the two parts of a three-way valve; and said casing is counterbored to provide the aforementioned manifold compartment 24, Figure 3.

A reciprocable valve member 30, which is biased inwardly by a spring 31 and which is provided with a cylindrical shaped bore to permit the passage of air therethrough, constitutes the other part of the two part pressure balanced three-way valve. One end of the latter valve member, is provided with diametrically spaced openings to receive therethrough a pin 32 and said pin extends through a connecting pin 34, one end of which extends within the member 30. The other end of the pin 34 extends beyond the valve member 30 and is detachably and pivotally connected to a two-part floating lever 36. The end portion 38 of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figure 3, the lever 36 is pivotally connected at one of its ends to a rod 41; and the movement of the rod to the left, Figure 3, is limited by a stop pin 42 adjustably mounted in the valve casing. The other end of the lever 36 is pivotally connected to a pin 43 which is slidably received at one of its ends in a recess 45' of the valve casing and which is secured at its other end to a flexible diaphragm 44. This diaphragm constitutes the power element of a valve operating pressure differential operated motor indicated as a whole by the reference numeral 45; and the operation of said motor is in large measure controlled by the gaseous pressure within the control compartment 46 of said motor, and by a preloaded compression spring 47 within said compartment. A compartment 48 of the motor 45 is vented to the atmosphere via a port 49 to which is connected an air cleaner, not shown.

The valve member 30 is recessed at 51 and the end of said member provides a land portion 52 which is adapted, in the operation of the valve, to be positioned to register the recess 51 with ports 53 in the valve member 28. The member 30 is also operated so that the land portion 52 covers the ports 53, that is, laps the valve and is also operated to interconnect said ports with the air cleaner via the motor compartment 48 and the interior of the valve member 30.

The valve member 28 is provided with an opening 53' adapted to register with one end of a duct 54 in the valve casing, said duct registering at its other end with a chamber 55 of a three-way solenoid and spring operated vacuum cutin valve indicated as a whole by the reference numeral 56 and disclosed in detail in Figure 4. The latter valve includes a valve member 57 secured to one end of an armature 58 of a solenoid 59. When the solenoid 59 is energized the valve member 57 moves downwardly, Figure 4, to seat at 60, thereby connecting the duct 54 with the intake manifold 61 of the internal combustion engine 62 of the vehicle via a conduit 63 and the chamber 55; and when the solenoid 59 is de-energized, a spring 64 serves to move the armature upwardly, Figure 4, to seat the valve member 57 and 65, thereby cutting off the vacuum connection and venting the duct 54 to the atmosphere via the air cleaner, not shown, chamber 48 of the motor 45, the recess 45' in the valve casing, a duct 66 in the valve casing, a valve chamber 55' and the valve chamber 55. A spring loaded check valve 67 may be included in the vacuum connection between the intake manifold and the valve chamber 55 thereby providing a means for maintaining the clutch disengaged in the event the conduit 63 is accidentally broken when the motor 10 is energized.

Completing the description of the valve unit 26 the casing 26' is provided with a duct 92, Figure 3, permanently interconnecting the control compartment 46 of the motor 45 with the valve compartment 24. There is thus provided fluid transmitting means for at all times interconnecting the motor compartment 46, the valve compartment 24, and the control compartment 13 of the clutch operating motor 10. It follows therefore that the operation of the clutch control mechanism constituting my invention is, in large measure, controlled by controlling the gaseous pressure within the valve compartment 24.

There is thus provided a compact valve control unit 26 comprising a multi-sectioned casing housing a pressure balanced three-way control valve 28, 30 and also housing means for operating said valve comprising a spring and pressure differential operated motor 45 and an accelerator operated rod 41, said rod and the power element of the motor being connected with the movable part 30 of said valve by means of the floating lever member 36.

Figure 5:
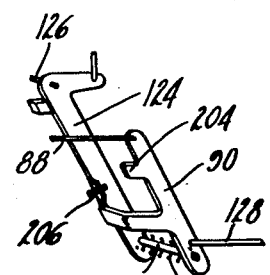
Figure 5 is a view disclosing the principal parts of the connection interconnecting the accelerator, throttle and the control valve.

Describing now the force transmitting means interconnecting the accelerator 118 of the car with a throttle operating crank 120 and with the valve operating rod 41, said rod is connected to a rod 88 and this rod is pivotally connected with a lever member 90, Figure 5. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132, all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A spring 144, which is weaker than a throttle return spring 145, is operative, together with the spring 145, to return the accelerator to its throttle closed position and to move the valve member 30 to the right, Figure 3, to open the three-way valve, that is operate the same to effect a clutch disengaging operation of the motor 10. The spring 144 is preferably sleeved over the pin 122 and is connected at its ends to the levers 90 and 124. The operation of this part of the mechanism of my invention will be described in greater detail hereinafter when the operation of the entire clutch control mechanism is described in detail.

The solenoid 59 which operates the vacuum cutin valve 56, is controlled by the electrical controls disclosed in Figure 1. Describing this electrical mechanism a grounded battery 70 is wired in series with the ignition switch 68 of the car, a clutch control cutout switch 69, the solenoid 59, and a grounded switch 71 which is opened by the second and high gear shift rail of the transmission 72 only when the transmission is established in its high gear setting. With this electrical hookup the valve 56 is opened, that is, the valve member 57 is seated at 60, when the switches 68 and 69 are closed and the transmission is established in any gear except high gear; accordingly, with the vacuum cutin valve opened there is provided a source of vacuum to make possible a clutch disengaging operation of the motor 10 when the accelerator is released to open the valve 28, 30 an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic; and to effect this operation of the mechanism of my invention there is provided a breaker switch 73 which is closed when the accelerator is released to close the throttle, and a grounded breaker switch 74 which is operated by a vehicle speed responsive governor, not shown. To effect the operation of the switch 73 there is provided a flange 75 on the accelerator operated rod 128, said flange being contactable with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and it follows, therefore, that the switch 73 is not opened until after the throttle has been opened to a limited degree.

Describing now an important feature of my invention a grounded solenoid 150, which is normally energized, is mounted within a casing member 152 of the motor 45 the armature 154 of said solenoid being connected to a plate 156 which is contacted by the outer end of the spring 47. The inner end of the spring 47 abuts one face of the diaphragm 44. Energization of the solenoid serves to move the armature 154 to the right, Figure 3, to further compress the spring 47 thereby changing the clutch engaging operation of the motor 45, all as will be explained in greater detail hereinafter; and deenergization of the solenoid permits the spring to expand a bit, the armature 154 moving to the left, Figure 3, until its left end portion 157 contacts the inner face of the motor casing member 152.

Figure 2:
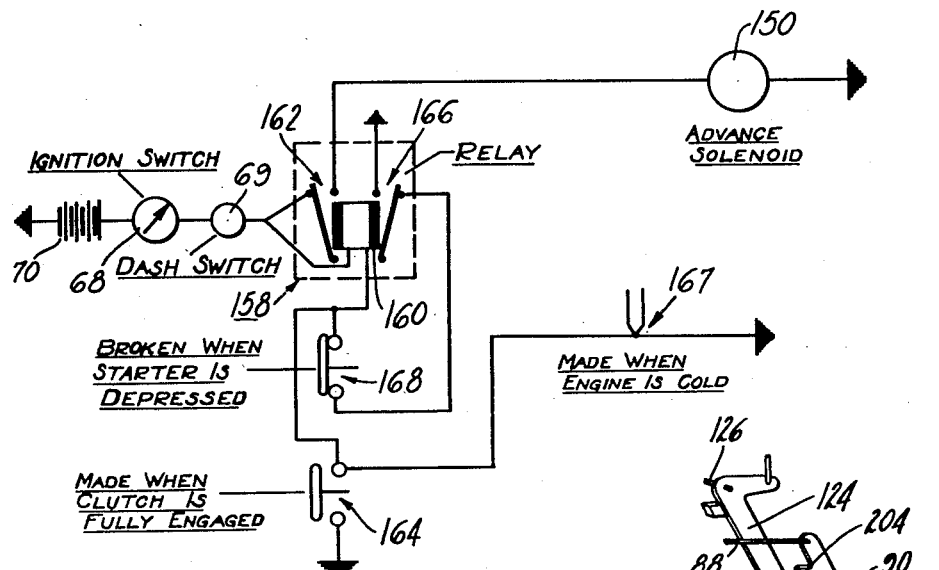
Figure 2 is a part of the electrical means for controlling the valve means of my invention.

The electrical means for controlling the operation of the grounded solenoid 150 is disclosed in Figure 2 and includes a hold-down relay 158 comprising a coil 160 and a normally open switch 162 the latter being electrically connected in series with the grounded solenoid 150, the ignition switch 68 of the vehicle and the grounded battery 70. The coil 160 is electrically connected in series with the battery, the ignition switch 68 and a grounded breaker switch 164. The latter switch is preferably actuated by the clutch operating crank 16 the parts of the mechanism being so constructed and arranged and so operative that said switch is closed when the clutch is fully engaged, that is when the crank 16 is in its fully released position; and it follows, of course, that the switch 164 is opened to break the electrical connection with the coil 160 when the clutch pedal is depressed to disengage the clutch the latter operation being effected prior to starting the engine. The coil 160 is also controlled by a grounded breaker switch 167 preferably electrically connected in parallel with the grounded switch 164; and the switch 167 is preferably actuated by a thermostat 169 operative in accordance with the temperature of the engine. The parts of the mechanism are so constructed and arranged and so operative that when the engine temperature is less than a certain factor the thermostat 169 operates to close the switch 167; and it follows of course that when the temperature of the engine is above this factor the switch is opened.

The hold-down relay 158 also includes a normally open grounded hold down switch 166 which is electrically connected in series with the coil 160 of the relay and a breaker switch 168 operated by the clutch pedal 20 when said pedal is actuated to operate the clutch and the starter switch 17. As is disclosed in Figure 2 the switch 168 may be electrically connected to the electrical connection interconnecting the coil 160 and the switch 164; and the parts of the mechanism are so constructed and arranged and so operative that the switch 168 is opened when the clutch pedal is depressed to start the engine, and closed when said pedal is released sufficiently to open the starter switch 17.

Describing now the complete operation of the mechanism constituting my invention and incidentally completing the description of the parts thereof not heretofore described, when the accelerator 118 is released to close the throttle and idle the internal combustion engine 62, the intake manifold 61 of said engine is partially evacuated. There is thus provided a source of vacuum for energizing the motor 10 to disengage the friction clutch of the motor vehicle; and this operation is effected inasmuch as with the release of the accelerator the movable three-way valve member 30 is moved to place said motor in air transmitting connection with the manifold. The valve member 30 and the means for operating the same then assume the relative positions disclosed in Figure 3 it being assumed that at the moment the solenoid 150 is deenergized. Air is then withdrawn from the clutch motor 10 and the compartment 46 of the motor 45 into the intake manifold via the conduit 63, the valve compartment 55, the duct 54, port 53', recess 51, ports 53, the compartment 24, the duct 92 interconnecting the compartment 24 with the valve motor compartment 46, and the conduit 22 interconnecting the compartment 24 with the control chamber 13 of the clutch motor 10.

The compartment 46 being then partially evacuated the diaphragm 44 is moved, by the differential of pressures acting on the same, to the position disclosed in Figure 3; for the gaseous pressure within the compartment 46 is at this time the same as that within the intake manifold of the idling engine and this gaseous pressure is of course the same as that within the control compartment of the then energized clutch operating motor 10. It is to be noted that in this clutch disengaged position of the parts the valve member 30 is moved to the left, Figure 3, to a position just short of a closing off of the ports 53 by the flanged end of said valve member, that is, the land 52.

Now it is to be noted that at this time the air transmitting connection with the intake manifold is made possible by virtue of the fact that the valve member 57 of the vacuum cutin valve unit 56 is removed from a seat 65; for the solenoid 59 which actuates said valve member is at the time energized to move the armature 58 and the valve member 57 connected thereto downwardly, Figure 4. Explaining this operation the solenoid 59 is at this time energized by virtue of a closing of the grounded breaker switch 74; for inasmuch as the car is at a standstill the vehicle speed responsive governor, not shown, is then operative to close said switch. The governor is so constructed that when the vehicle is at a standstill or is traveling below a relatively low speed, say ten miles per hour, then the governor is operative to close the grounded switch 74 thus completing an electrical circuit including the switch 74, the then closed accelerator operated switch 73, the solenoid 59, the cutout switch 69, the ignition switch 68 of the vehicle and the grounded battery 70.

It is also to be noted at this juncture that when the valve operating motor 45 is energized the movement to the left, Figure 3, of the diaphragm 44 of said motor not only serves to move the valve member 30 to the position disclosed in said figure but also serves to compress the spring 47; and as will be described hereinafter the degree of compression of said spring, determined in large measure by the operation of the power element 44 and the operation of the solenoid 150, constitutes a factor in the control of the valve to effect the stage operation of the clutch operating motor.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling shift lever, not shown, to its low gear position.

Continuing now the description of the cycle of operations of the clutch control mechanism, the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle return spring 145; and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 3, to rotate the lever member 36 about its pivotal connection with the pin 43 as a fulcrum. The valve member 30 is thus moved to the left, Figure 3, the lever 36 operating as a lever of the second class, to place the valve ports 53 in communication with a valve chamber 210 which chamber is at all times connected to the atmosphere via the interior of the valve member 30 and the vented valve compartment 48.

It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small.

The valve member 30 having been moved to the left to vent the valve compartment 24 to atmosphere there results a relatively rapid flow of air into both the control compartment 13 of the clutch operating motor 10 and the compartment 46 of the valve operating motor 45; and this flow of air results in a clutch engaging operation of the motor 10. Describing this operation the power element of the motor 10 is moved to the right, Figure 1, by the clutch springs and when said springs have expanded sufficiently to bring the clutch plates just slightly into engagement with each other, the movement of the power element is arrested.

Explaining this arresting operation, the clutch springs, by their expansion, serve to maintain a relatively low gaseous pressure, that is vacuum, within the control chamber 13 of the motor 10. Now inasmuch as said control chamber is at all times connected to the valve chamber 24 of motor chamber 46 it follows that the gaseous pressure within said chambers is also maintained relatively low by virtue of the expansion of the clutch springs. As described above, when the clutch springs have expanded a certain amount, that is, when their vacuum creating pulling power has decreased to a certain factor, then the spring 47 automatically moves to the right, Figure 3, that is, expands, thereby lapping the three-way valve 28, 30. Describing this operation of the valve the valve member 30 moves to the right until the land portion 52 registers with the ports 53 of the valve member 28; and when this occurs the flow of air into the chamber 46 and the motor 10 is automatically cut off and the system is then in equilibrium.

In this operation the lever 90 rotates counterclockwise about the pivotal connection between the pin 122 and said lever, said pivotal connection acting as a fulcrum. As stated above, the parts of the mechanism of my invention are so constructed and arranged, particularly the strength or load of the clutch springs, the area of the diaphragm 44 and the rate of the spring 47, that the valve is lapped to arrest the movement of the power element of the clutch motor when the clutch plates are just moved into contact with each other.

This operation of the motor 10 is usually described as the first stage operation thereof and it is to be particularly noted that by varying the rate of the spring 47 and/or by compressing said spring by the energization of the solenoid 150 that the termination of the first stage operation of the motor may be varied. In other words, by varying the rate of the spring 47 there is provided means for varying the degree of loading of the clutch plates when the first stage of clutch engaging operation of the motor 10 is completed. It is also to be noted that the mechanism of my invention is preferably so constructed that this first stage of clutch engaging operation of said motor is completed at substantially the same time as the opening of the throttle is initiated and as a result of a relatively small degree of depression of the accelerator. This first stage operation of the motor 10 is completed very quickly and with a normal operation of the accelerator the driver will probably momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is appreciably opened.

To effect the step by step second stage of clutch engaging operation of the motor 10 the driver continues the depression of the accelerator thereby effecting a clockwise rotation of the bell crank lever 124 to open the throttle; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the motor compartment 46 and the control compartment 13 of the clutch motor 10 in communication with the atmosphere, thereby increasing the gaseous pressure therein. The clutch springs then automatically resume their expansion to move the clutch plates into contact with each other with greater force. As before, if the driver arrests the movement of the accelerator after this resumption of movement of the valve member 30 said member again moves to its lapped position by virtue of a resumption of the expansion of the spring 47. In this valve lapping operation the direction of movement of the valve member 30 is again reversed, the lever 36 again fulcruming about its connection with the rod 41. As with the above described first stage of clutch engaging operation of the mechanism the spring 47 expands to move the valve member 30 to its lapped position when the differential of pressure acting on the diaphragm 44 is reduced to a certain factor by the flow of air into the chamber 48. As with the first stage operation of the mechanism, the valve is lapped when the force exerted by the spring 47 equals the force exerted by the diaphragm 44.

The clutch plates are thus first moved just slightly into engagement with each other and then pressed into firmer contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is the operation to effect the relatively rapid movement of the clutch plates up to a point just slightly in engagement with each other, will, by virtue of the relatively fast movement of the valve member 30 and its degree of movement during the initial increment of the accelerator, be effected very quickly. The second stage clutch engaging operation of my clutch control mechanism is effected more slowly inasmuch as the bell crank lever 124 is operated as a throttle operating lever of the first class, the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed at substantially the same time as the opening movement of the throttle is initiated. The adjustable stop 42 serves to control the mechanism to limit the clutch plate loading factor said factor preferably being such as to prevent a stalling of the engine.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher gear ratio setting.

There is thus provided, by the friction clutch control mechanism of my invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. In this clutch disengaging operation of the power means the accelerator, in its operation of the three-way valve 28, 30 cooperates with the governor in its operation of closing the switch 74 and the accelerator 118 in its operation of closing the switch 73. As to the clutch engaging operation of the power means of my invention, said operation is effected, through the intermediary of the floating lever 36, by an operation of the accelerator, an operation of the solenoid 150 and an operation of the valve operating motor 45. It is also to be noted that with the clutch control mechanism of my invention if the driver should fail to depress the accelerator to operate the valve 28, 30 just after the transmission is established in its high gear setting, that the bleed of air into the motor 10 via the duct 66 will nevertheless insure an engagement of the clutch. The operation of the mechanism might be effected if the transmission were placed in its high gear setting just before the vehicle started to descend a grade.

The valve mechanism of my invention which is the most important feature thereof, insures a two stage operation of the clutch motor and a resulting smooth engagement of the clutch, with any mode of operation of the accelerator; for the operation of the leverage changing force transmitting connections and the throttle spring 145 virtually insure this two stage operation of the mechanism when the clutch is engaged as a result of a normal operation of the accelerator. The floating lever 36 interconnecting the reciprocable valve member 30 with the accelerator operated rod 41 and the power element 44 of the valve operating motor 45, provide a very simple, yet effective, means for operating the three-way control valve 28, 30; the varying of the rate of the spring 47 and the operation of the solenoid 150 providing a means for determining when the first stage of engagement of the clutch is completed. The particular force transmitting means interconnecting the throttle valve, the valve member 30 and the accelerator 118 insures a completion of the first stage of engagement of the clutch just as the throttle is opened; and the step by step clutch engaging or disengaging operations of the power element of the clutch motor insures the desired maneuvering of the vehicle in traffic or when the vehicle is being parked.

However the most important feature of my invention lies in the provision of the means for varying the compression of the spring 47 said means including the solenoid 150 controlled by the thermostatic switch 167 and/or the clutch pedal operated switches 164 and 168. There is thus provided, by the solenoid 150, means for varying the loading of the clutch plates at the completion of the first stage of engagement of the clutch, that is when the clutch plates are first brought into contact with each other and just as the throttle is opened. With the clutch control mechanism of my invention an energization of the solenoid 150 results in a relatively light first stage engagement of the clutch and a de-energization of the solenoid results in just the opposite effect, that is a relatively heavy first stage engagement; for when the solenoid 150 is energized the spring 47 is more completely compressed resulting in a lower gaseous pressure; that is, higher vacuum, within the control compartments 46 and 13 when the first stage of engagement of the clutch is completed, that is when the valve 28, 30 is first lapped.

Explaining this operation in greater detail assuming the engine to be relatively warm, that is capable of developing a normal torque, the driver will then desire a relatively heavy engagement of the clutch in getting the car under way. This would be particularly true if the clutch plates are at the time covered with oil; for such a heavy, that is forceful, engagement of clutch would aid in removing the undesirable oil on said plates. Then after the first engagement of the clutch all subsequent engagements, that is movement of the clutch plates into contact with each other, should be relatively light, that is less forceful; for a heavy engagement, with the latter engagement of the clutch, would result in a jerking of the vehicle which is of course undesirable. With the mechanism of my invention the above operations are achieved inasmuch as the switches 164 and 168 are opened when the clutch pedal is depressed this operation being effected incidental to starting the engine in the operation of getting the vehicle under way; and the opening of the switches 164 and 168 results in a de-energization of the normally energized solenoid 150 thereby making possible the aforementioned relatively heavy engagement of the clutch. Then all subsequent engagements of the clutch, that is those engagements after the car is in motion, are relatively light inasmuch as when the crank 16 is moved to its clutch engaged position to close the switch 164 the relay 158 is energized and the hold-down switch 166 of the relay then takes over the control to maintain said energization. The inclusion of the switch 168 in the mechanism is desirable inasmuch as the driver might, in the operation of preparing to start the car, close the ignition switch 68 prior to depressing the clutch pedal to close the engine starter switch 17; and with such an operation the omission of the switch 168 would result, after the energization of the coil 160 and the resulting energization of the solenoid 150, in a continued energization of said solenoid so long as the ignition switch remained closed. This operation would of course defeat one of the principal objects of the invention hence the necessity for the switch 168 which is opened when the clutch pedal is depressed sufficiently to close the starter switch 17 to crank the engine.

As to the operation of the thermostatically controlled switch 167 we will assume that the clutch plates are covered with oil and that the engine is cold, say after standing in the garage all night. Then it is obviously desirable to overrule the clutch pedal operated switch 164 and to make the first engagement of the clutch rather light thereby preventing a stalling of the engine and giving the clutch a chance to throw off the oil on the driving and driven plates thereof. With the mechanism of my invention this end is accomplished inasmuch as the thermostatically controlled switch 167 is closed, to effect an energization of the solenoid 150, when the engine is cold; and when the engine is subsequently warmed up, making continued light engagements of the clutch in order, then the switch 167 is opened and the switch 164 takes over the control to maintain the solenoid 150 energized. There is thus provided, by the incorporation of the switch 167 in the clutch control mechanism of my invention, means for insuring a relatively light first engagement of the clutch when the engine is cold.

Although only one embodiment of the invention has been illustrated and described, various changes in the form and relative arrangements of the parts may be made to suit requirements.

I claim:

1. In an automotive vehicle provided with an internal combustion engine having an intake manifold, a friction clutch, and a manually operated pedal for operating the clutch; power means for operating the clutch including a pressure differential operated motor operably connected to the clutch, valve means for controlling the operation of the said motor including a three-way valve operable to effect a clutch disengaging operation of the motor and a clutch engaging operation thereof, fluid transmitting means interconnecting the manifold and valve, means venting the valve to the atmosphere, fluid transmitting means interconnecting the valve and motor, and means for operating the valve including a fluid motor and a spring, together with means for compressing said spring to vary its operation in the control of the fluid motor including a solenoid, and electrical means for controlling the operation of the solenoid including a relay, and switch means, actuated by the clutch pedal, for controlling the operation of the relay.

2. In an automotive vehicle provided with an internal combustion engine having an intake manifold, a friction clutch, a manually operated pedal for operating the clutch; power means for operating the clutch including a pressure differential operated motor operably connected to the clutch, valve means for controlling the operation of said motor including a three-way valve operable to effect a clutch disengaging operation of the motor and a clutch engaging operation thereof, fluid transmitting means interconnecting the manifold and valve, means for venting the valve to the atmosphere, fluid transmitting means interconnecting the valve and motor, and means for operating the valve including a fluid motor and a spring, together with means for compressing said spring to vary its operation in the control of the fluid motor including a solenoid, and electrical means for controlling the operation of the solenoid including a hold-down relay, and switch means, actuated by the clutch pedal, for controlling the operation of the coil of the relay said switch means including two different switches which are broken when the clutch pedal is depressed.

3. In an automotive vehicle provided with an accelerator, a manually operated clutch pedal, an engine starter switch operated by said pedal, a throttle, and a friction clutch comprising a driving plate and a driven plate, power means for operating the clutch including a valve member, means for controlling the operation of the valve member to effect a certain loading of the clutch plates by the power means when the accelerator has been depressed to open the throttle a slight amount said means including a pressure differential operated motor and a spring for controlling the operation of the motor, together with a solenoid operative to load the spring to effect the aforementioned certain loading of the clutch plates, and electrical means for controlling the operation of the solenoid including switch mechanism actuated by the clutch pedal incidental to its operation of closing the engine starter switch in the operation of cranking the engine.

4. In an automotive vehicle including an internal combustion engine, a clutch pedal, a switch constituting part of the means for starting the engine, and a friction clutch; power means for operating the clutch including a stage type of pressure differential operated motor operably connected to the clutch, valve means for controlling the operation of the motor including a pressure balanced three-way valve which is lapped in the operation of completing the first stage of clutch engaging operation of the motor, means for controlling the operation of the three-way valve including a spring, and means for compressing the spring, to control the lapping operation of the valve, comprising a grounded solenoid acting directly upon the spring, together with means for controlling the operation of the solenoid including a hold-down relay comprising a coil and a normally open switch electrically connected to the solenoid, a grounded clutch pedal operated switch electrically connected to the coil, a normally open hold-down switch constituting part of the relay mechanism, and a switch operatively connected with the engine starter switch and electrically connected to the hold-down switch, the parts of the mechanism being so constructed and arranged and so operative that when the clutch pedal is depressed the coil of the relay is de-energized thereby effecting a de-energization of the grounded solenoid.

5. In an automotive vehicle provided with a manually operated clutch pedal and a starter switch constituting part of the means for starting the engine of the vehicle; a stage type of motor for operating the clutch, a pressure balanced valve mechanism, including a valve and a valve operating spring, for controlling the operation of the motor said valve being lapped when the motor is operated to effect the first stage clutch engaging operation thereof, means for compressing the spring to control the clutch engaging operation of the valve, and electrical means for controlling the spring compressing means comprising a grounded battery, a hold-down relay including a coil, a normally open switch and a grounded normally open hold-down switch, and means for controlling the operation of the relay including a grounded clutch pedal operated breaker switch electrically connected to the coil together with a switch operated by the clutch pedal incidental to the operation, by said pedal, of the starter switch, said latter clutch pedal operated switch being electrically connected in series with the grounded hold-down relay switch and the coil.

6. In an automotive vehicle provided with a friction clutch, a clutch pedal and an engine starter switch; a stage type of motor for operating the clutch, a pressure balanced valve mechanism, including a valve and a valve operating spring, for controlling the operation of the motor said valve being lapped when the motor is operated to effect the first stage of clutch engaging operation thereof, means, including a grounded solenoid for compressing the spring to control the clutch engaging operation of the valve, and electrical means for controlling the solenoid comprising a grounded battery, a hold-down relay comprising a normally open switch electrically connected in series with the battery and solenoid, a coil, and a normally open hold-down switch; together with means for controlling the operation of the relay including a grounded switch electrically connected to the coil, and an engine controlled thermostat for operating the latter switch.

7. In an automotive vehicle comprising an internal combustion engine, an engine controlled thermostat and a friction clutch; power means for operating the clutch comprising a pressure differential operated motor operably connected to the clutch, valve means for controlling the motor including a three-way valve, means for actuating the valve including a pressure differential operated motor comprising a power element and a spring for loading the power element, a grounded solenoid having its armature connected to the spring whereby when the solenoid is energized the spring is compressed, and means for controlling the operation of the solenoid including a relay comprising a coil and a normally opened switch electrically connected to the solenoid, together with grounded switch operated by the thermostat and electrically connected to the coil.

8. In an automotive vehicle provided with an accelerator, an engine starter switch operated by the clutch pedal of the vehicle, an internal combustion engine having an intake manifold, a carburetor including a throttle valve and a friction clutch; power means for operating the clutch including a pressure differential operated motor, force transmitting means interconnecting the power element of the motor with the clutch, a manually operable clutch pedal operable to actuate the starter switch said pedal cooperating with a part of the force transmitting means to provide means for operating the clutch by power without disturbing the clutch pedal the latter however being operable at the will of the driver to disengage the clutch, a three-way valve for controlling the operation of the motor, force transmitting means, including a lost motion connection, interconnecting the accelerator, the throttle valve, and a part of the three-way valve, the lost motion connection providing means for effecting an operation of the valve prior to effecting more than a slight opening of the throttle, other means for operating the valve including a pressure differential operated motor and a spring the latter being in contact with the power element of the motor, a solenoid for loading the spring to control the operation of the spring in the control of the three-way valve, electrical means for controlling the operation of the solenoid including a hold-down relay and means for controlling the operation of the relay including a switch operated by the clutch pedal incidental to its operation of operating the engine starter switch and electrically connected to the hold-down switch of the relay, together with another switch actuated by the clutch pedal and electrically connected to the coil of the relay, the parts of the clutch control mechanism being so constructed and arranged and so operative that the first increment of the depression of the accelerator serves, by virtue of the aforementioned lost motion connection, to initiate an operation of the valve to effect a part of the clutch engaging operation of the motor said first increment of depression serving to open the throttle to a limited extent.

9. In an automotive vehicle provided with an accelerator, an internal combustion engine having an intake manifold, a carburetor including a throttle valve and a friction clutch; power means for operating the clutch including a pressure differential operated motor operably connected to the clutch, a three-way valve for controlling the operation of the motor, force transmitting means, including a lost motion connection, interconnecting the accelerator, the throttle valve and a part of the three-way valve, said lost motion connection providing means for effecting a clutch engaging operation of the valve prior to initiating any substantial opening of the throttle, other means for operating the valve including a pressure differential operated motor and a spring, the latter being in contact with the power element of the motor, a solenoid for loading the spring to control the operation thereof in its control of the three-way valve, and electrical means for controlling the operation of the solenoid including a thermostat controlled by the engine, together with switch means actuated by the thermostat.

EDWIN E. PRATHER.

REFERENCES CITED

The following references are of record in the file of this patent:

UNITED STATES PATENTS

| Number | Name | Date |
| --- | --- | --- |
| 2,317,216 | Paton | Apr. 20, 1943 |
| 2,326,943 | Hill | Aug. 17, 1943 |
| 2,365,469 | Hey | Dec. 19, 1944 |